(12) United States Patent
Singh et al.

(10) Patent No.: US 12,367,491 B1
(45) Date of Patent: Jul. 22, 2025

(54) INTELLIGENT METHOD AND APPARATUS TO VALIDATE SAFE DEPOSIT BOX LEVERAGING SPATIAL COMPUTING LIDAR TECHNOLOGY

(71) Applicant: Bank of America Corporation, Charlotte, NC (US)

(72) Inventors: Shailendra Singh, Maharashta (IN); Ankit Dholakiya, Gujarat (IN); Arup Francis, Chennai Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 32 days.

(21) Appl. No.: 18/605,911

(22) Filed: Mar. 15, 2024

(51) Int. Cl.
*G06Q 20/38* (2012.01)
*G06T 11/00* (2006.01)
*G01S 17/89* (2020.01)

(52) U.S. Cl.
CPC .......... *G06Q 20/389* (2013.01); *G06T 11/001* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 9,336,456 | B2* | 5/2016 | DeLean | G06V 40/20 |
| 11,741,427 | B2* | 8/2023 | Phillips | B25H 3/00 |
| | | | | 715/769 |
| 2021/0243218 | A1* | 8/2021 | Todd | H04L 9/50 |
| 2022/0217306 | A1* | 7/2022 | Ratnakaram | G01G 19/52 |
| 2025/0078632 | A1* | 3/2025 | Carter | G08B 13/19608 |

* cited by examiner

*Primary Examiner* — Paul S Schwarzenberg
(74) *Attorney, Agent, or Firm* — Weiss & Arons LLP

(57) ABSTRACT

Systems and methods are provided for monitoring contents of a safe deposit box leveraging spatial computing light detection and ranging ("LiDAR"). The systems and methods include creating a baseline non-fungible token ("NFT"). The baseline NFT is created by scanning the contents of the safe deposit box using a LiDAR camera, setting a plurality of virtual spatial anchors on the contents of the scanning, defining relative distances between the anchors, extracting spatial metadata from the scanning and minting the NFT using the scanning, anchors, relative distances and metadata. The systems and methods include creating a second scanning using the LiDAR camera. Extracting second metadata from the second scanning. Comparing the baseline NFT with the second scanning and second metadata. Generating an anomaly score based on the comparison. Alerting a user when the anomaly score exceeds an anomaly threshold.

20 Claims, 6 Drawing Sheets

INTELLIGENT METHOD AND APPARATUS TO VALIDATE SAFE DEPOSIT BOX LEVERAGING SPATIAL COMPUTING LIDAR TECHNOLOGY

FIELD OF TECHNOLOGY

Aspects of the disclosure relate to using LiDAR technology for intelligent validation of safe deposit boxes.

BACKGROUND OF THE DISCLOSURE

Safe deposit boxes are a common way to secure valuable assets. A customer may secure various assets in a safe deposit box. The assets may have intrinsic value, extrinsic value or emotion value. The assets may be, for example, cash, precious metals, precious stones, important documents, artifacts, art and or any other suitable object which are able to be stored in a safe deposit box. The customer may desire to view the assets frequently. The customer may desire to validate the authenticity of the assets frequently.

Currently, safe deposit boxes may be stored in a secure location. The secure location may be within a financial institution. Accessing the safe deposit box may require the customer to visit the secure location. Accessing the secure location may require the customer to verify customer information with the financial institution in which the safe deposit box is located. Accessing the safe deposit box may require an appointment with the financial institution. Accessing the safe deposit box may require a key or other means for opening the safe deposit box. The above requirements may hinder or prevent the customer from accessing the safe deposit box whenever the customer desires. Not being able to authenticate the assets within the customer's safe deposit box any time the customer desires may frustrate or create undue anxiety in the customer. A news report of a robbery at the customer's financial institution may exacerbate these emotions. Currently, there are no mechanisms for a customer to authenticate their assets in real time.

The customer may desire that their assets remain private. The customer may be anxious about others handling their assets. The handling or mishandling of an asset may cause the value of the asset to decrease. Upon visiting the safe deposit box, the customer may not notice whether someone else handled their asset, especially when the customer has not seen where the asset was placed for some time. This may weigh on the customer's mind and create frustration and anxiety.

Another situation that may weigh on the customer's mind is the replacement of their asset with a replica. For example, a customer's priceless artifact may be replaced in the safe deposit box with a replica. The customer may not notice whether their asset has been replaced, especially when the customer has not seen the original for some time.

Therefore, it would be desirable to provide real time access to the contents of a safe deposit box. It would be further desirable to provide verification that the contents of the safe deposit box have not been handled. It would be further desirable to provide verification that the contents of the safe deposit box have not been replaced. It would be further desirable to maintain the privacy of the contents of the safe deposit box.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
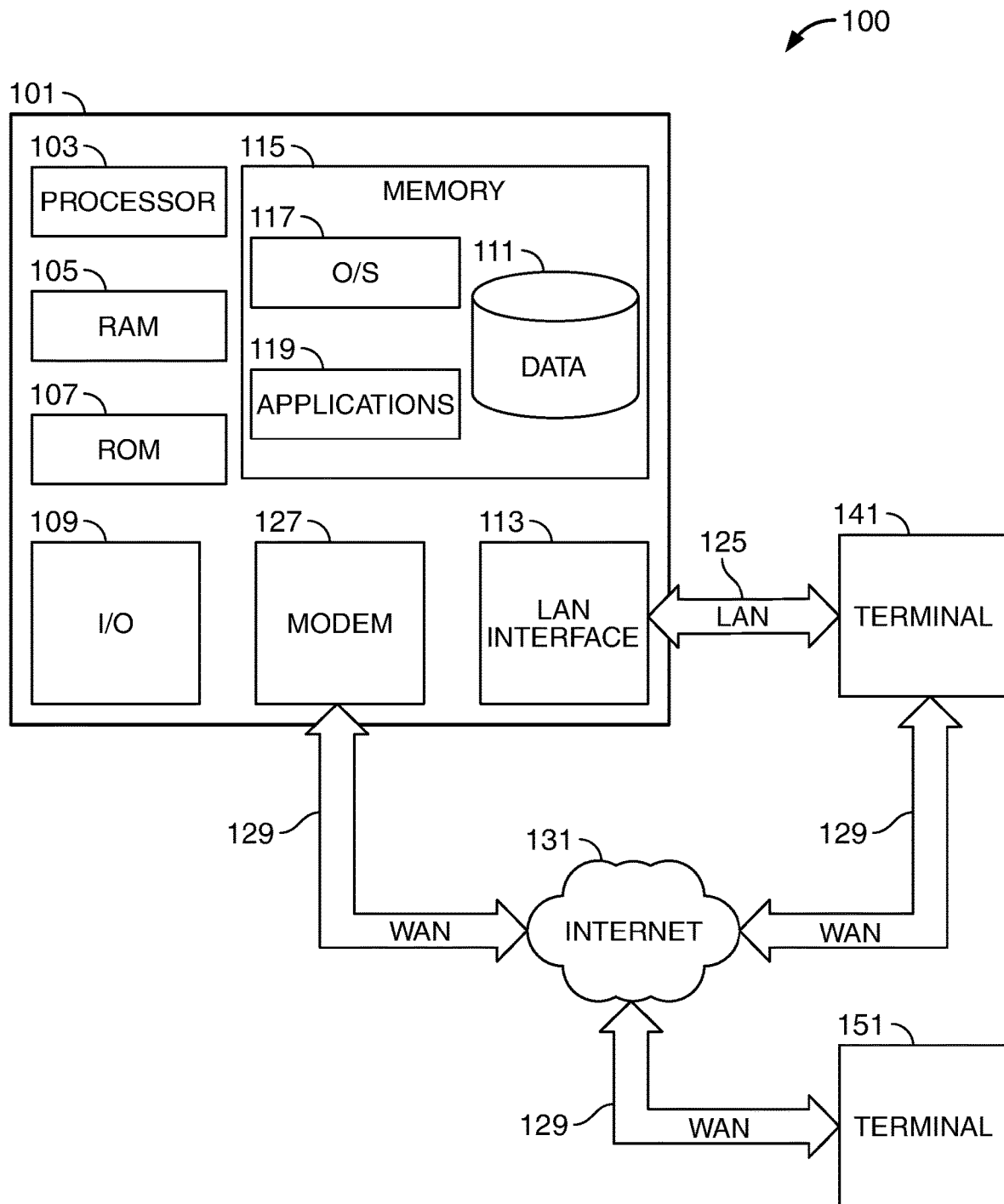
FIG. 1 shows an illustrative apparatus in accordance with principles of the disclosure.

Systems and methods are provided for monitoring contents of a safe deposit box leveraging spatial computing light detection and ranging ("LiDAR").

The systems and methods may include providing a safe deposit box in a financial institution. A LiDAR camera may be positioned within the safe deposit box. The LiDAR camera may be positioned to scan the entire contents of the safe deposit box. The safe deposit box may include a memory and a processor. The memory and processor may be positioned within a wall of the safe deposit box.

The processor may include a plurality of engines and programs. The processor may include a virtual user account onboarding engine, a LiDAR scanning engine, a spatial telemetry extraction engine, an AI engine, a non-fungible token ("NFT") generation engine, a safe deposit box monitoring engine, a spatial anomaly scoring engine, a fraud alert engine, a deep learning module, a LiDAR spatial maps database and an NFT wallet.

The systems and methods may include creating a baseline NFT of the contents of the safe deposit box. The baseline NFT may be compared to any subsequent scan of the contents of the box. The comparison may show whether the contents of the box have been moved or replaced.

Securing the baseline information as a baseline NFT may be more secure than securing the information as a digital file. NFTs are unique and cannot be replicated. NFT information may be stored on a blockchain thus allowing the NFT to be immutable and verifiable. NFTs may include ownership information, date of creation and other attributes. As such NFTs may be advantageous over digital files. The NFT may be stored in the NFT wallet.

The creation of the baseline NFT may include executing, using a LiDAR camera positioned inside the safe deposit box, a first scanning of the contents of the safe deposit box. The first scanning may be executed according to programming provided by the LiDAR scanning engine. The first scanning may be used to establish a first spatial map of the inside of the safe deposit box. The LiDAR camera may be mounted such that it can swivel. The LiDAR camera may be mounted on one or more tracks. The LiDAR camera may be able to move along the tracks. The execution of the first scanning may include repositioning the LiDAR camera at different angles and/or positions along the track throughout the scan. The first spatial map may include a 2 dimensional image. The first spatial map may include a 3 dimensional image. The first spatial map may include topographical data points.

The first spatial map may be sent to the AI engine. The AI engine may set a plurality of virtual spatial anchors on the contents depicted in the first spatial map. The virtual spatial anchors may be placed at random positions on the contents. The virtual spatial anchors may be placed at predetermined positions. The anchors may be private. The anchors may be unknown to the financial institution. The AI engine may define relative distances between each virtual spatial anchor. The relative distances may be private. The relative distances may be unknown to the financial institution.

The spatial telemetry extraction engine may extract LiDAR spatial metadata from the first scanning. The metadata may include time, date and location of the first scanning. The metadata may include the owner of the safe deposit box. The metadata may include in which financial institution the safe deposit box is located. The metadata may include how long the scanning took. The metadata may include any other relevant information. The metadata may be private. The metadata may be unknown to the financial institution.

The NFT generation engine may receive the first spatial map, the anchors, the relative distances and the metadata. The NFT generation engine may mint the baseline NFT based on the first spatial map, the anchors, the relative distances and the metadata. The baseline NFT may represent the safe deposit box as the user intended.

The baseline NFT may be transferred to the NFT database. The baseline NFT may be stored in the NFT database. The baseline NFT may be transferred through a homomorphic encryption layer. The NFT database may belong to the financial institution. The NFT database may include a baseline NFT for each user. A user may desire that the contents of their safe deposit box remain private. The homomorphic encryption layer may encrypt the information stored in the baseline NFT. The homomorphic encryption of the baseline NFT may allow for computations to be performed on the encrypted baseline NFT. The baseline NFT may be stored on an NFT wallet. The NFT wallet may belong to the financial institution. The NFT wallet may belong to the user.

In order to access the baseline NFT the user may create a virtual deposit account. The user may create the virtual deposit account using the virtual deposit account onboarding engine. The baseline NFT may be associated with the virtual deposit account. The baseline NFT may be created when the user opens the virtual deposit account. The baseline NFT may be created upon a user request. The baseline NFT may be replaced with a new baseline NFT upon a user request. The new baseline NFT may be created in a comparable manner to the baseline NFT.

The systems and methods may include using the baseline NFT to verify that the contents of the safe deposit box have not been moved or replaced. The baseline NFT may be compared to new scans of the contents of the safe deposit box to determine whether the contents have been moved or replaced. The user may request the new scans. The new scans may be carried out at regular intervals.

The systems and methods may include using the LiDAR camera to execute, at a point in time later than the minting of the baseline NFT, a second scanning of the contents of the safe deposit box to establish a second spatial map. The second scanning may be used to establish a second spatial map inside the safe deposit box. The second scanning may include repositioning the LiDAR camera at various positions throughout the scan. The second spatial map may include a 2 dimensional image. The second spatial map may include a 3 dimensional image. The second spatial map may include topographical data points. The spatial telemetry extraction engine may extract second metadata from the second scanning.

The deep learning module may compare the second spatial map and the second metadata with the baseline NFT. The deep learning module may retrieve the second spatial map and the second metadata from the LiDAR scanning engine through the homomorphic encryption layer. The deep learning module may retrieve the baseline NFT from the NFT database. The deep learning module may verify that the baseline NFT belongs to the same user as the second spatial map and second metadata. The deep learning module may identify differences between the baseline NFT and the second spatial map. The deep learning module may identify differences between the baseline NFT and the second metadata.

A difference in the relative distances between the spatial anchors may indicate an object has been moved. A difference in the topographical information of an object may indicate the object has been replaced with a forgery. The LiDAR camera may be able to accurately measure points on objects in the safe deposit box up to millimeters or micrometers. The deep learning module may be able to manipulate the homomorphic encrypted baseline NFT and the homomorphic encrypted second spatial map to identify the differences between two points without knowing what the points represent.

The comparison may be transferred through the homomorphic encryption layer to the spatial anomaly scoring engine. The spatial anomaly scoring engine may generate an anomaly score based on the comparison between the baseline NFT and the second spatial map and the second metadata. The user may set parameters for the anomaly scoring engine. The parameters may be used in generating the anomaly score. The parameters may include a first factor based on a variation in the relative distances. The parameters may include a second factor based on a variation in the topographical information. The user may set the weight of each parameter on the anomaly score. The user may set how precise the differences need to be to register as an anomaly. The user may set how many anomalies may increase the anomaly score.

The user may set an anomaly threshold. The anomaly scoring engine may send the anomaly score to the fraud alert engine. The fraud alert engine may alert the user when the anomaly score exceeds the anomaly threshold. The fraud alert engine may alert the user through the virtual deposit account.

The systems and methods may contemplate movement of the contents of the safe deposit box due to circumstances other than theft or mishandling. Such circumstances may include an earthquake, moving of the safe deposit box by the financial institution, visit of the safe deposit box by the user and any other suitable circumstances. The fraud alert engine may first determine whether the anomaly score exceeded the threshold due to a circumstance. The fraud alert engine may check for anomalous vibrations indicative of an earthquake. The fraud alert engine may check with certain weather or news stations to verify whether an anomalous vibration was an earthquake. The fraud alert engine may check with the financial institution whether the safe deposit box is being moved. The fraud alert engine may prompt the user to indicate whether the user is visiting the safe deposit box.

When the fraud alert engine verifies that a non-fraudulent circumstance has occurred, the fraud alert engine may cancel the alert.

A user may request the second scanning. The execution of the second scanning may be at regular intervals. The contents of the safe deposit box may be continuously scanned. The continuous scanning may include a continuous comparison of the contents of the safe deposit box with the baseline NFT.

The systems and methods may include viewing the contents of the safe deposit box in real time. The LiDAR camera may be in communication with the virtual deposit account. The communication may be via an internet connection. A user of the virtual deposit account may be able to connect an extended reality ("XR") device to the virtual deposit account. An XR device user may be required to login into the virtual deposit account from the XR device. When the XR device user is connected to the virtual deposit account the XR device user may view the contents of the safe deposit box via the LiDAR camera. The XR device user may view the contents in an XR setting via a live feed from the LiDAR camera. The XR device user may manipulate the position of the LiDAR camera while in the XR setting.

The user may view the contents in an XR setting in real time. The user may overlay the first spatial map over the contents of the safe deposit box in the XR setting. Overlaying the first spatial map over the contents of the safe deposit box may identify variations between the first spatial map and the contents.

The virtual deposit account may be in communication with the processor of the safe deposit box. The virtual deposit account may be in communication with the safe deposit box monitoring engine. The safe deposit box monitoring engine may be in communication with the LiDAR camera. The safe deposit box monitoring engine may be in communication with the deep learning module through the homomorphic encryption layer. The safe deposit monitoring engine may send the deep learning module a LiDAR camera feed through the homomorphic encryption layer. The deep learning module may receive the baseline NFT from the NFT database. The deep learning module may identify the variations between the feed and the baseline NFT in real time. The deep learning module may send the variations and the baseline NFT to the safe deposit monitoring engine.

The safe deposit box monitoring engine may send the baseline NFT to the XR device. The XR device may overlay the first spatial map of the baseline NFT over the feed from the LiDAR camera. The safe deposit box monitoring engine may send the variations to the XR device. The XR device may highlight portions of the contents of the safe deposit box which are different from the first spatial map of the baseline NFT. The highlighted portions may be highlighted in a shade of a color. The shading of the color may correlate with the size of the variation. A first variation may be shown as a darker shade of the color. A second smaller variation may be shown as a lighter shade of the color. The user may select the specific size of variation attributed to each shade of the color. The overlayed first spatial map may be a heatmap overlay.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the systems and method disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 along with any other data 111 needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) along with any data needed for the operation of the apparatus. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refers to applications located on a server remote from a user, wherein some or all the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 via a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

In an embodiment, one or more programs, or aspects of a program, may use one or more AI/ML algorithm(s).

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked via a communications network, e.g., cloud-based applications. In a distributed computing environment, program modules may be located in both local and remote computer storage media including memory storage devices.

Figure 2:
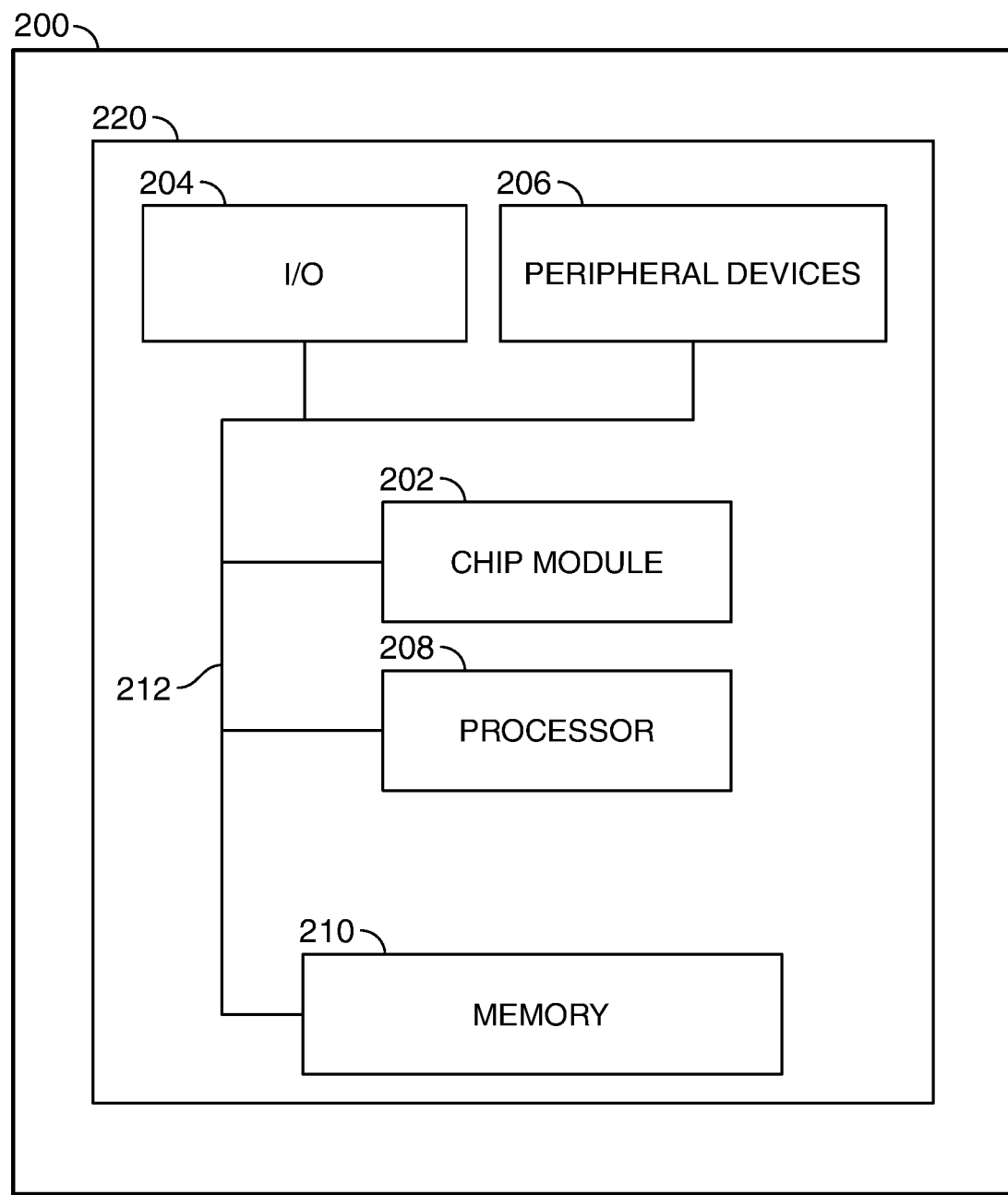
FIG. 2 shows another illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
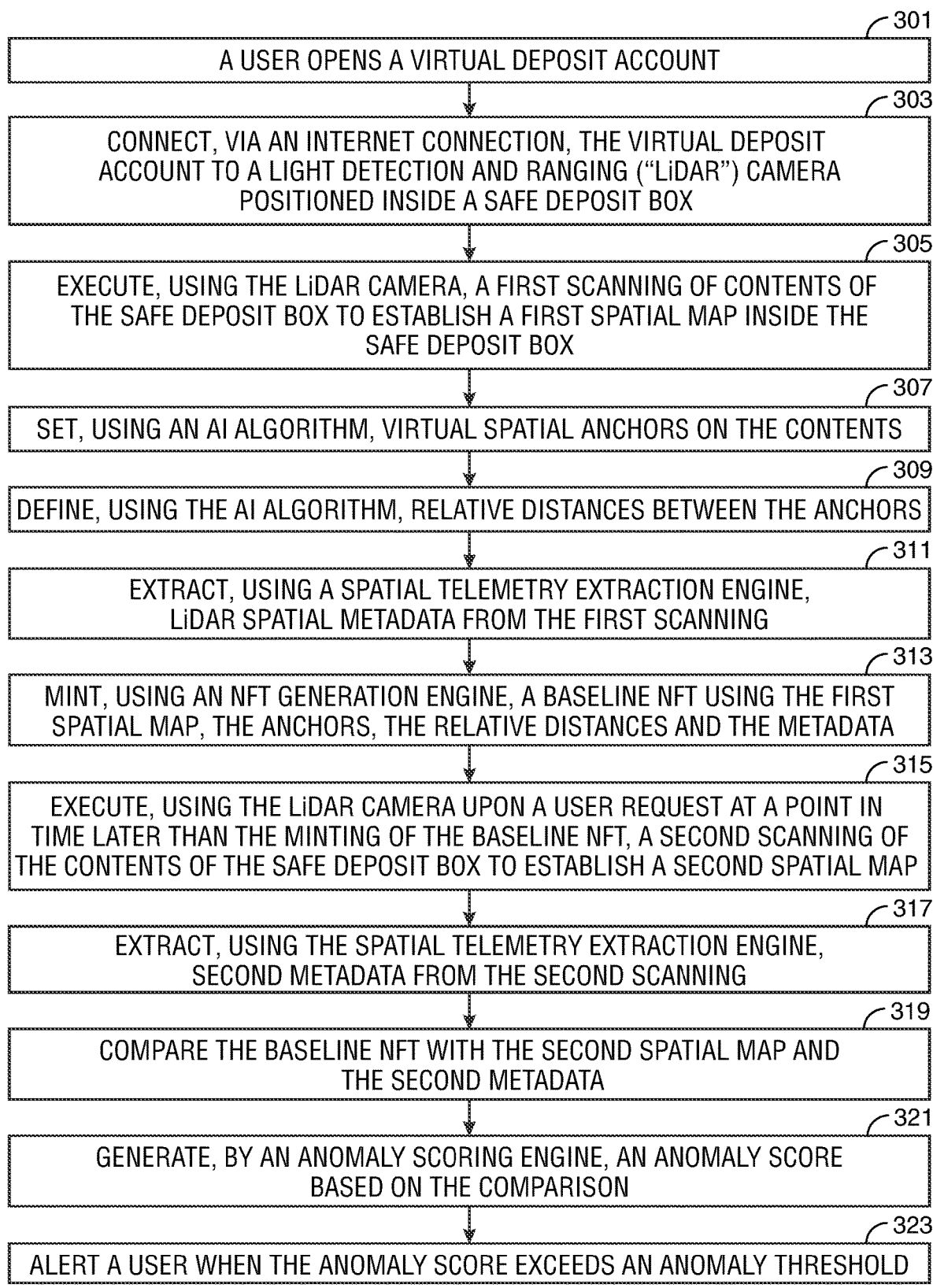
FIG. 3 shows an illustrative flowchart in accordance with principles of the disclosure.

FIG. 3 shows an illustrative flowchart in accordance with principles of the disclosure. At step 301, methods may include a user opening a virtual deposit account. At step 303, methods may include connecting, via an internet connection, the virtual deposit account to a light detection and ranging ("LiDAR") camera positioned inside a safe deposit box. At step 305, methods may include executing, using the LiDAR camera, a first scanning of the contents of the safe deposit box to establish a first spatial map inside the safe deposit box. At step 307, methods may include setting, using an AI algorithm, virtual spatial anchors on the contents.

At step 309, methods may include defining, using the AI algorithm, relative distances between the anchors. At step 311, methods may include extracting, using a spatial telemetry extraction engine, LiDAR spatial metadata from the first scanning. At step 313, methods may include minting, using an NFT generation engine, a baseline NFT using the first spatial map, the anchors, the relative distances and the metadata.

At step 315, methods may include executing, using the LiDAR camera upon a user request at a point in time later than the minting of the baseline NFT, a second scanning of the contents of the safe deposit box to establish a second spatial map. At step 317, methods may include extracting, using the spatial telemetry extraction engine, second metadata from the second scanning. At step 319, methods may include comparing the baseline NFT with the second spatial map and the second metadata.

At step 321, methods may include generating, by an anomaly scoring engine, an anomaly score based on the comparison. At step 323, methods may include alerting a user when the anomaly score exceeds an anomaly threshold.

Figure 4:
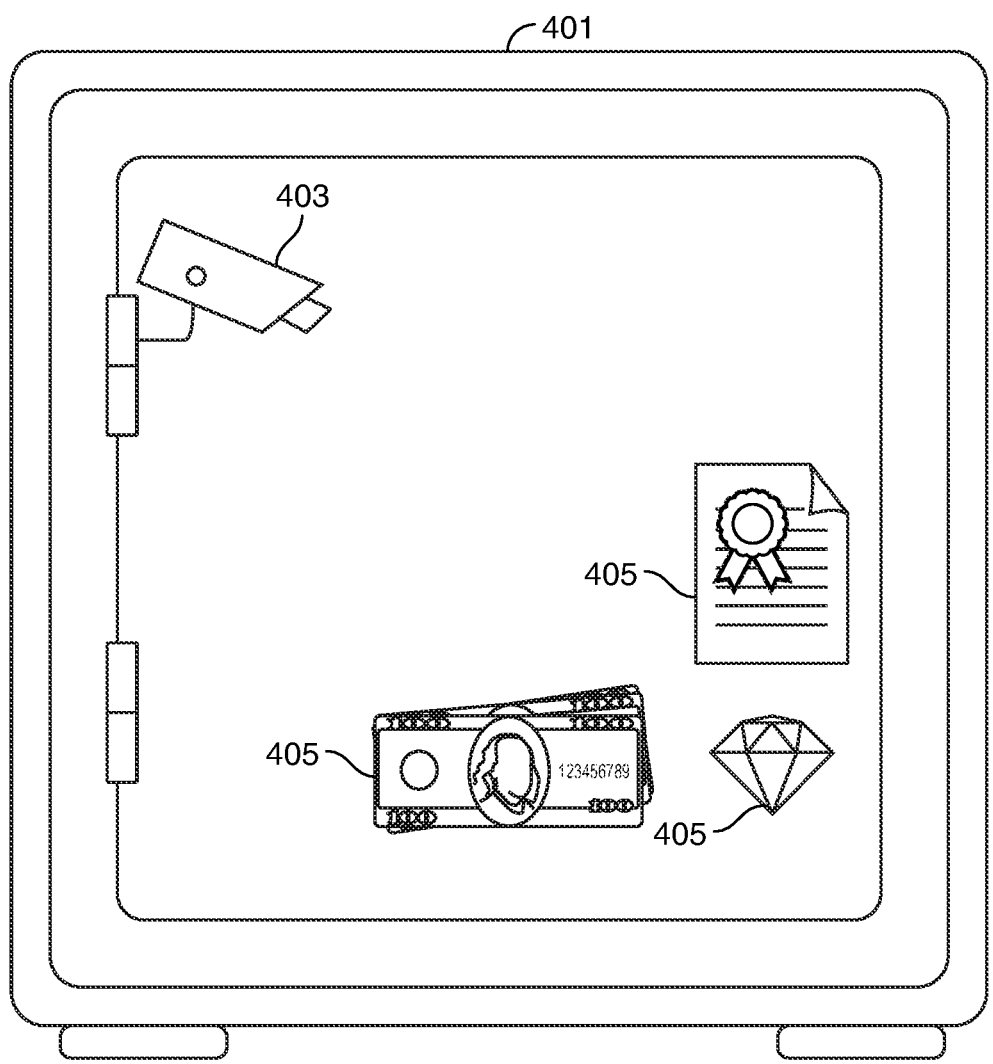
FIG. 4 shows an illustrative diagram in accordance with principles of the disclosure.

FIG. 4 shows an illustrative diagram in accordance with principles of the disclosure. Safe deposit box 401 may include LiDAR camera 403. Safe deposit box 401 may store contents 405. Contents 405 may include cash, important documents, precious stones and/or any other suitable items.

Figure 5:
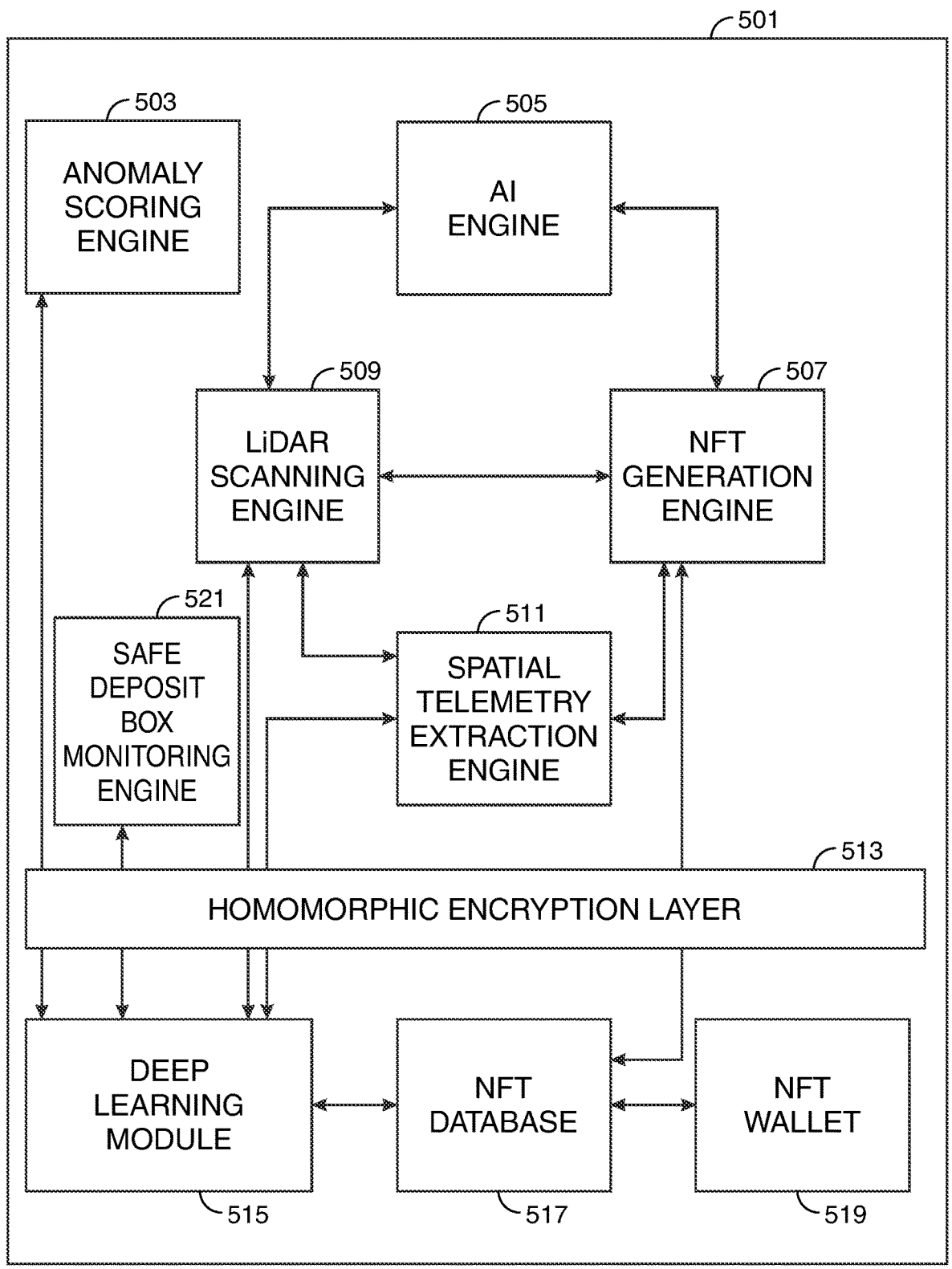
FIG. 5 shows another illustrative diagram in accordance with principles of the disclosure.

FIG. 5 shows another illustrative diagram in accordance with principles of the disclosure. Processor 501 may be stored in a wall of safe deposit box 401. Processor 501 may include some or all the features of processor 103. Processor 501 may include anomaly scoring engine 503, AI engine 505, NFT generation engine 507, LiDAR scanning engine 509, spatial telemetry extraction engine 511, homomorphic encryption later 513, deep learning module 515, NFT database 517 and NFT wallet 519.

LiDAR scanning engine 509 may be in communication with LiDAR camera 403. LiDAR scanning engine 509 may receive the scan from LiDAR camera 403. LiDAR scanning engine 509 may include scanning instructions for LiDAR camera 403. LiDAR scanning engine 509 may send a first scanning to AI engine 505. AI engine 505 may receive the first scanning from LiDAR scanning engine 509. AI engine 505 may create anchors on objects in the first scanning. AI engine 505 may define relative distances between the anchors. LiDAR scanning engine 509 may send the first scanning to spatial telemetry extraction engine 511. Spatial telemetry extraction engine 511 may extract spatial metadata from the first scanning.

NFT generation engine 507 may be in communication with AI engine 505, LiDAR scanning engine 509, and spatial telemetry extraction engine 511. NFT generation engine 507 may receive the first scanning from LiDAR scanning engine 509. NFT generation engine 507 may receive the anchors and relative distances from AI engine 505. NFT generation engine 507 may receive the metadata from spatial telemetry extraction engine 511. NFT generation engine 507 may generate an NFT using the first scanning, the anchors, the relative distances and the metadata.

NFT generation engine 507 may send the NFT to NFT database 517. The NFT may be sent through homomorphic encryption layer 513. Homomorphic encryption layer 513 may encrypt the NFT such that the information remains private while allowing the data to be manipulated. NFT database 517 may store the NFT. NFT database 517 may send the NFT to be stored in NFT wallet.

Deep learning module 515 may receive the NFT from NFT database 517. Deep learning module may receive a second scanning from LiDAR scanning engine 509. The second scanning may be sent through homomorphic encryption layer 513. The contents of the safe deposit box may remain private from deep learning module 515 by sending the second scanning through homomorphic encryption layer 513. Deep learning module 515 may receive second metadata relating to the second scanning from spatial telemetry extraction engine 511. The second metadata may be sent through homomorphic encryption layer 513. Deep learning module 515 may compare the NFT with the second scanning and second metadata. Deep learning module 515 may send the comparison results to anomaly scoring engine 503. The comparison results may be sent to anomaly scoring engine 503 through homomorphic encryption layer 513. Anomaly scoring engine 503 may generate an anomaly score based on the comparison results.

Safe deposit box monitoring engine 521 may be in communication with LiDAR camera 403. Safe deposit box monitoring engine 521 may be in communication with deep learning module 515 through homomorphic encryption layer. Safe deposit box monitoring engine 521 may be in communication with a virtual deposit account.

Figure 6:
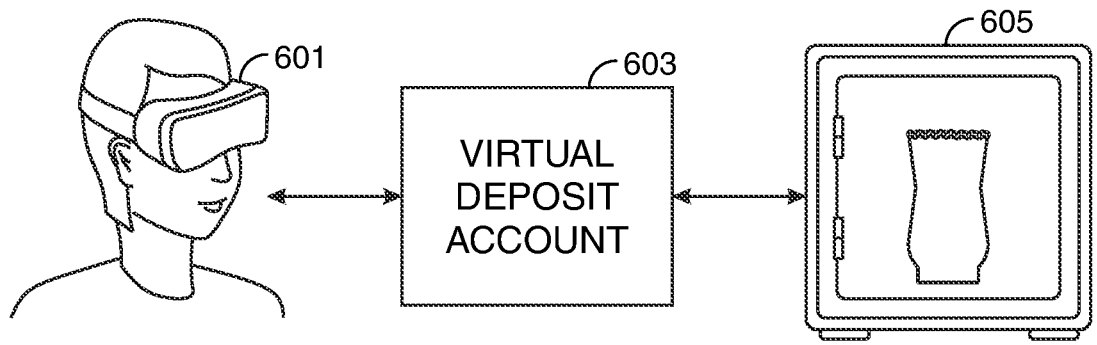
FIG. 6 shows another illustrative diagram in accordance with principles of the disclosure.

FIG. 6 shows another illustrative diagram in accordance with principles of the disclosure. XR device 601 may connect to virtual deposit account 603 via an internet connection. Virtual deposit account 603 may connect to a processor (not shown) in safe deposit box 605 via an internet connection. The processor may include some or all the features of processor 103 and/or 501. The processor may be in communication with LiDAR camera 403. User may view the contents of safe deposit box 605 using XR device 601. User may view the contents in an XR setting.

Figure 7:
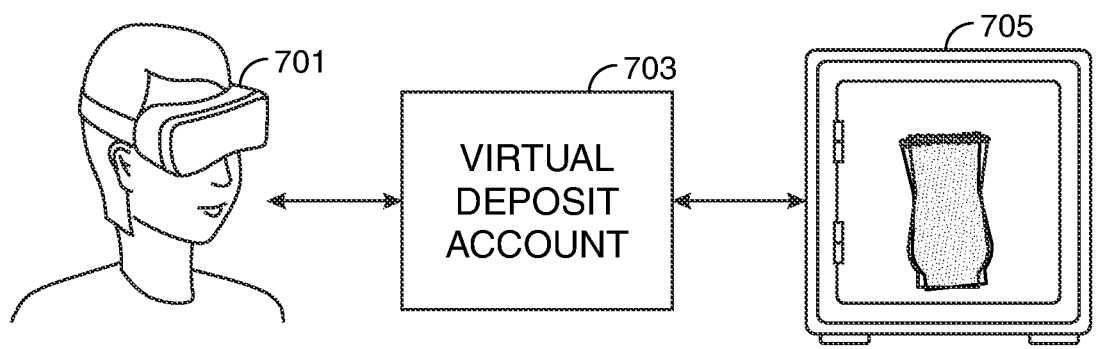
FIG. 7 shows another illustrative diagram in accordance with principles of the disclosure.

FIG. 7 shows another illustrative diagram in accordance with principles of the disclosure. XR device 701 may connect to virtual deposit account 703 via an internet connection. Virtual deposit account 703 may connect to a processor (not shown) in safe deposit box 705 via an internet connection. The processor may include some or all the features of processor 103 and/or 501. The processor may be in communication with LiDAR camera 403. User may view the contents of safe deposit box 705 using XR device 701.

User may view the contents in an XR setting. A first scanning of the contents may be overlayed on top of the real time visual. The first scanning may be constructed as a heatmap overlay on the contents. Any differences between the first scanning and the real time visual may be highlighted or shaded.

Thus, systems and methods for INTELLIGENT METHOD AND APPARATUS TO VALIDATE SAFE DEPOSIT BOX LEVERAGING SPATIAL COMPUTING LIDAR TECHNOLOGY have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method for monitoring contents of a safe deposit box leveraging spatial computing light detection and ranging ("LiDAR"), the method comprising:
    creating a baseline non-fungible token ("NFT") comprising:
        executing, using a LiDAR camera positioned inside the safe deposit box, a first scanning of the contents of the safe deposit box to establish a first spatial map inside the safe deposit box;
        setting, using an AI engine and the first scanning, a plurality of virtual spatial anchors on the contents;
        defining, using the AI engine, relative distances between the anchors;
        extracting, using a spatial telemetry extraction engine, LiDAR spatial metadata from the first scanning; and
        minting, using an NFT generation engine, the baseline NFT using the first spatial map, the anchors, the relative distances and the metadata;
    using the LiDAR camera to execute, at a point in time later than the minting of the baseline NFT, a second scanning of the contents of the safe deposit box to establish a second spatial map;
    extracting, using the spatial telemetry extraction engine, second metadata from the second scanning;
    comparing the baseline NFT, using a deep learning module, with the second spatial map and the second metadata;
    generating, using an anomaly scoring engine, an anomaly score based on the comparing; and
    alerting a user when the anomaly score exceeds an anomaly threshold.

2. The method of claim 1 wherein:
    the first and second spatial maps include topographical information;
    the creating is executed upon the user opening a virtual deposit account for the safe deposit box;
    the virtual deposit account is in internet communication with the LiDAR camera;
    the executing the second scanning is performed upon a user request; and
    the alerting the user is performed via the virtual deposit account.

3. The method of claim 2 further comprising:
    connecting, via an internet connection, an extended reality ("XR") device to the virtual deposit account;
    verifying an XR device user upon a login into the virtual deposit account from the extended reality device; and
    viewing, upon verification of the XR device user, the contents in an XR setting using the XR device in real time.

4. The method of claim 3 wherein:
    during the viewing, the XR device overlays the first spatial map with the contents in the XR setting;
    variations between the first spatial map and the viewed contents are highlighted; and
    a color of the highlighted contents correlates with a size of the variation.

5. The method of claim 2 further comprising:
    transferring, through a homomorphic encryption layer, the baseline NFT to an NFT database; and
    storing the baseline NFT in the NFT database;
    wherein the comparing comprises:
        retrieving, by the deep learning module, the baseline NFT from the NFT database;
        verifying that the baseline NFT belongs to the user;
        retrieving, by the deep learning module through the homomorphic encryption layer, the second spatial map and the second metadata; and
        identifying differences between the baseline NFT and the second spatial map.

6. The method of claim 2 further comprising replacing the baseline NFT, upon a user request, with a second baseline NFT;
    wherein the second baseline NFT is created using a third scanning of the contents of the safe deposit box.

7. The method of claim 1 wherein:
    the anomaly scoring engine generates the anomaly score based on a first factor and a second factor;
    the first factor is based on a variation in the relative distances; and
    the second factor is based on a variation in the topographical information.

8. The method of claim 1 wherein, when the anomaly score exceeds the anomaly threshold, the alerting is not sent to the user upon a detection of an anomalous vibration.

9. A device for monitoring contents of a safe deposit box leveraging spatial computing light detection and ranging ("LiDAR"), the device comprising:
    a processor; and
    a non-transitory computer readable medium storing instructions that when executed by the processor:
        creates a baseline non-fungible token ("NFT") comprising:
            executing, using a LiDAR camera positioned inside the safe deposit box, a first scanning of the contents of the safe deposit box to establish a first spatial map inside the safe deposit box;
            setting, using an AI engine and the first scanning, virtual spatial anchors on the contents;
            defining, using the AI engine, relative distances between the anchors;
            extracting, using a spatial telemetry extraction engine, LiDAR spatial metadata from the first scanning; and
            minting, using an NFT generation engine, the baseline NFT using the first spatial map, the anchors, the relative distances and the metadata;
        uses the LiDAR camera to execute, at a point in time later than the minting of the baseline NFT, a second scanning of the contents of the safe deposit box to establish a second spatial map;
        extracts, using the spatial telemetry extraction engine, second metadata from the second scanning;
        compares the baseline NFT, using a deep learning module, with the second spatial map and the second metadata;

generates, using an anomaly scoring engine, an anomaly score based on the comparing; and alerts a user when the anomaly score exceeds an anomaly threshold.

10. The device of claim 9 wherein:

the first and second spatial maps include topographical information;

the creating is executed upon the user opening a virtual deposit account for the safe deposit box;

the virtual deposit account is in internet communication with the LiDAR camera;

the executing the second scanning is performed upon a user request; and the alerting the user is performed via the virtual deposit account.

11. The device of claim 10 wherein:

an extended reality ("XR") device is connected, via an internet connection, to the virtual deposit account;

an XR device user is verified upon a login into the virtual deposit account from the extended reality device; and the contents are viewed, upon verification of the XR device user, in an XR setting using the XR device in real time.

12. The device of claim 11 wherein:

the XR device overlays the first spatial map with the contents in the XR setting;

variations between the first spatial map and the viewed contents are highlighted; and a color of the highlighted contents correlates with a size of the variation.

13. The device of claim 10 wherein:

the baseline NFT is transferred, through a homomorphic encryption layer, to an NFT database;

the baseline NFT is stored in the NFT database; and the comparing comprises:

retrieving, by the deep learning module, the baseline NFT from the NFT database;

verifying that the baseline NFT belongs to the user;

retrieving, by the deep learning module through the homomorphic encryption layer, the second spatial map and the second metadata; and identifying differences between the baseline NFT and the second spatial map.

14. The device of claim 10 wherein:

the baseline NFT is replaced, upon a user request, with a second baseline NFT; and the second baseline NFT is created using a third scanning of the contents of the safe deposit box.

15. The device of claim 9 wherein:

the anomaly scoring engine generates the anomaly score based on a first factor and a second factor;

the first factor is based on a variation in the relative distances; and the second factor is based on a variation in the topographical information.

16. The device of claim 9 wherein, when the anomaly score exceeds the anomaly threshold, the alerting is not sent to the user upon a detection of an anomalous vibration.

17. A method for monitoring contents of a safe deposit box leveraging spatial computing light detection and ranging ("LiDAR"), the method comprising:

opening a virtual deposit account;

connecting, via an internet connection, the virtual deposit account to a LiDAR camera positioned inside the safe deposit box;

creating a baseline non-fungible token ("NFT") comprising:

executing, using the LiDAR camera, a first scanning of the contents of the safe deposit box to establish a first spatial map inside the safe deposit box;

setting, using an AI engine and the first scanning, virtual spatial anchors on the contents;

defining, using the AI engine, relative distances between the anchors;

extracting, using a spatial telemetry extraction engine, LiDAR spatial metadata from the first scanning; and minting, using an NFT generation engine, the baseline NFT using the first spatial map, the anchors, the relative distances and the metadata;

using the LiDAR camera to execute, at a point in time later than the minting of the baseline NFT, a second scanning of the contents of the safe deposit box to establish a second spatial map;

extracting, using the spatial telemetry extraction engine, second metadata from the second scanning;

comparing the baseline NFT, using a deep learning module, with the second spatial map and the second metadata;

generating, using an anomaly scoring engine, an anomaly score based on the comparing; and alerting a user when the anomaly score exceeds an anomaly threshold;

wherein the first and second spatial maps include topographical information.

18. The method of claim 17 further comprising:

connecting an extended reality ("XR") device to the virtual deposit account;

verifying an XR device user upon a login into the virtual deposit account from the extended reality device; and viewing, upon verification of the XR device user, the contents in an XR setting using the XR device in real time.

19. The method of claim 17 further comprising:

transferring, through a homomorphic encryption layer, the baseline NFT to an NFT database; and storing the baseline NFT in the NFT database;

wherein the comparing comprises:

retrieving, by the deep learning module, the baseline NFT from the NFT database;

verifying that the baseline NFT belongs to the user;

retrieving, by the deep learning module through the homomorphic encryption layer, the second spatial map and the second metadata; and identifying differences between the baseline NFT and the second spatial map.

20. The method of claim 17 further comprising replacing the baseline NFT, upon a user request, with a second baseline NFT;

wherein the second baseline NFT is created using a third scanning of the contents of the safe deposit box.

* * * * *